(12) United States Patent
Peacock

(10) Patent No.: US 6,288,252 B1
(45) Date of Patent: Sep. 11, 2001

(54) MILKFAT TREATMENT

(75) Inventor: Ian Charles Peacock, Whangarei (NZ)

(73) Assignee: Kiwi Dairy Products Limited, Whangarei (NZ)

( * ) Notice: Subject to any disclaimer, the term of this patent is extended or adjusted under 35 U.S.C. 154(b) by 0 days.

(21) Appl. No.: 09/155,526

(22) PCT Filed: Mar. 27, 1997

(86) PCT No.: PCT/NZ97/00039

§ 371 Date: Sep. 24, 1998

§ 102(e) Date: Sep. 24, 1998

(87) PCT Pub. No.: WO97/36475

PCT Pub. Date: Oct. 9, 1997

(30) Foreign Application Priority Data

Mar. 29, 1996 (NZ) .................................................... 286280

(51) Int. Cl.[7] ........................................................ C11B 3/00

(52) U.S. Cl. ........................ 554/205; 426/520; 426/521; 261/158

(58) Field of Search ........................... 554/205; 261/158; 426/520, 521

(56) References Cited

U.S. PATENT DOCUMENTS

| | | | |
|---|---|---|---|
| 4,310,476 | 1/1982 | Nahra et al. | 261/118 |
| 4,419,301 | 12/1983 | Nahra et al. | 261/118 |
| 4,591,463 | 5/1986 | Nahra et al. | 261/116 |

Primary Examiner—Deborah D. Carr

(57) ABSTRACT

The color level in milkfat is reduced by heating milkfat to 200 degrees C. and 300 degrees C. for a period of less than tern minutes, preferably using an intimate thermal contact between the heater and the milkfat. The heater may in one embodiment have a heated inner core which may include a plurality of longitudinal or spiral or other grooves of channels on its outer surface to provide elongate flow paths for the milkfat.

20 Claims, 5 Drawing Sheets

MILKFAT TREATMENT

BACKGROUND OF INVENTION

The present invention relates to improvements in and relating to processes and/or apparatus for the treatment of milkfat. More particularly the present invention relates to processes and/or apparatus for the reduction of carotene and colour levels in milkfat.

To the present time the use of milkfat for some food products has needed to overcome the inherent problem that standard milkfat is yellow due to its colouring by carotene.

In order to bleach milkfat to make it suitable for use in food products, where the yellow colour would be unacceptable, typically processing equipment used for decolourising vegetable oil has been leased or hired out. This, however, has proved a very expensive operation in that such oil decolourisers are very expensive to run involving a lengthy process time for the milkfat. Typically utilising oil decolourisation equipment, the milkfat may have to be processed for up to eight hours. A further difficulty is that such oil decolourisation plants are typically, at least in New Zealand, geographically remote from the milkfat supply, involving the need to transport the milkfat to and from the decolourisation plant.

OBJECTS OF THE INVENTION

It is thus an object of the present invention to provide a process and/or apparatus for the decolourisation of milkfat, which term including gradations of colour removal, from the reduction of colour to a substantial total removal or bleaching of the milkfat, and in a relatively simple and cost effective way, and which will avoid or at least obviate problems in such processes/apparatus to the present time or which at least will provide the public with a useful choice.

Further objects of this invention, which should be considered in all its novel aspects, will become apparent from the following description,

BRIEF SUMMARY OF THE INVENTION

According to one aspect of the present invention a process for the reduction of the colour level in milkfat comprises:
  (i) Providing a heating means adapted to enable a flow therethrough of a quantity of milkfat;
  (ii) Controlling said flow of milkfat through said heating means and/or controlling the temperature of said heating means whereby the temperature of said milkfat as it passes through said heating means is between substantially 200° C. and 300° C. for a time sufficient to reduce the colour of said milkfat by a required amount.

According to a further aspect of the present invention there is provided apparatus for the reduction of the colour level in milkfat comprising:
  (i) A heating means adapted to allow a flow therethrough of a quantity of milkfat;
  (ii) Flow control and/or temperature control means provided for or associated with said heating means whereby said quantity of milkfat as it passes through said heating means is raised to a temperature of substantially between 200° C. and 300° C. for a time sufficient to decolour the quantity of milkfat by a required amount.

In one possible embodiment of the invention said heating means as defined in either of the two immediately above paragraphs may include a plurality of longitudinal or spiral grooves or channels through which said quantity of milkfat is caused to travel as it is heated.

In one possible embodiment of the invention said heating means of any of the three immediately above paragraphs may provide a required pressure or partial vacuum on said quantity of milkfat.

Possibly in one embodiment a vapour release may be provided to atmosphere or partial vacuum.

In one possible embodiment of the invention said milkfat may be de-aerated before it is entered into said heating means.

In one possible embodiment of the invention said milkfat may have vapour or gas introduced before or after it is entered into said heating means.

Possibly the apparatus and/or process for the decolourisation of milkfat is substantially as herein described with reference to the accompanying drawings.

Further aspects of this invention which should be considered in all its novel aspects will become apparent from the following description given by way of example of possible embodiments thereof and in which reference is made to the accompanying drawings,

DESCRIPTION OF PREFERRED EMBODIMENTS

To the present time the decolourisation of milkfat has involved utilizing equipment designed for use in respect of another food product, namely edible oil. This has resulted, as mentioned above, in considerable costs and process times being involved.

Typically a process time for the decolourisation of milkfat using such equipment could be of the order of 8 hours.

The present applicant has however found that by increasing the process temperature and ensuring the efficient heating of the milkfat, a shorter process time, possibly of less than 10 minutes, can result in an acceptable decolourisation of the milkfat.

The present invention, as will now be described, therefore provides a high temperature, short time, process whereby the carotene in milkfat, which results in the yellow colour, can be broken down and the milkfat thereby decoloured.

Figure 1:
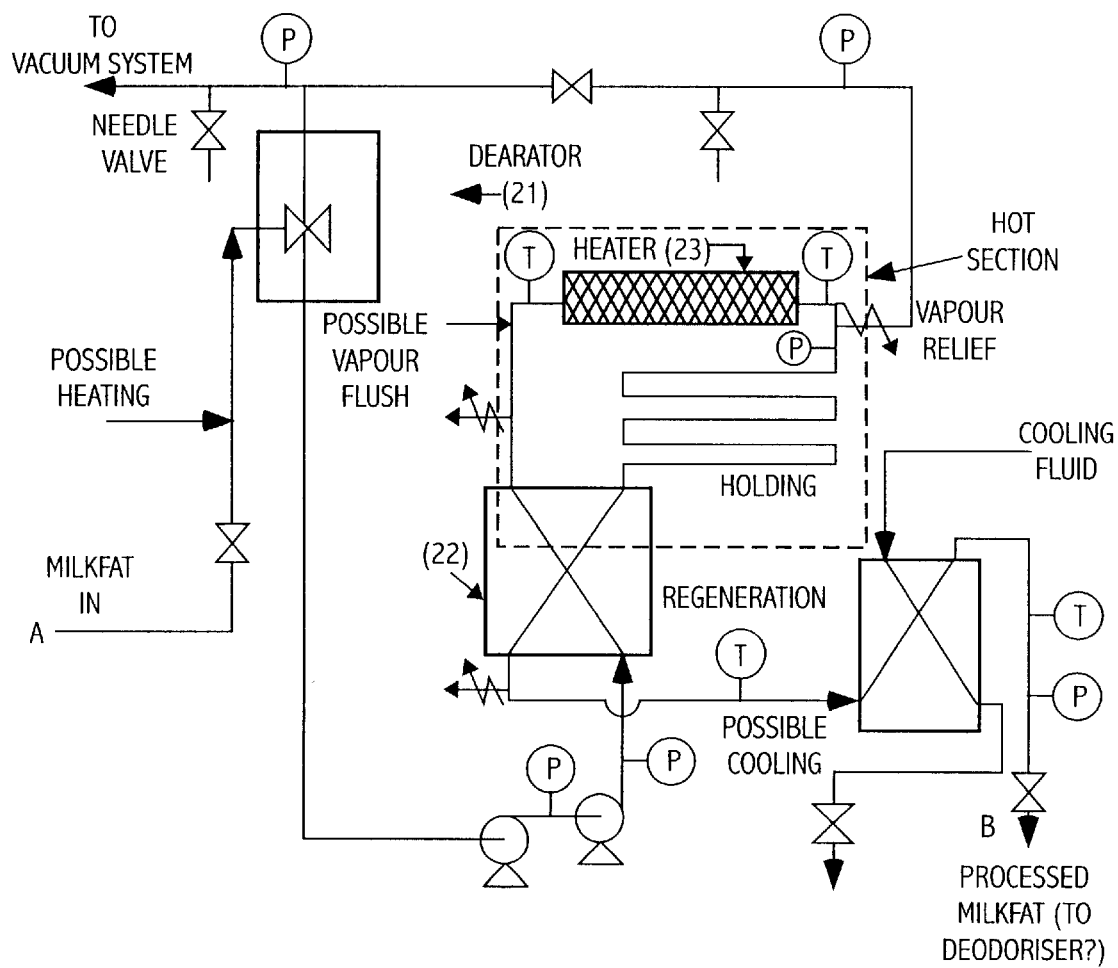
FIG. 1: Shows diagrammatically one possible apparatus/process for the decolourisation of milkfat according to one possible embodiment of the invention.

Referring to FIG. 1 a possible process flow path is shown with the milkfat being introduced into the process line in a direction indicated by arrow A into a de-aerator 21 and then through a heat exchanger 22 to a heating means 23 which will be described hereinafter in greater detail in one possible embodiment.

The heating of the milkfat in the heating means 23 is at a sufficiently high temperature and held for a sufficient time that the end product exiting in a direction indicated by arrow B has a colour which has been reduced to a sufficient degree with the breaking down of the carotene which has occurred.

The heating means 23 may be of any suitable type. However, the applicant has found that a heating means 23 where a substantially intimate contact between the milkfat and the heat source is provided, can achieve a beneficial effect. The integers identified as "P" or "T" in the FIG. 1 are typically respective pressure and temperature monitoring and/or control means.

Figure 2:
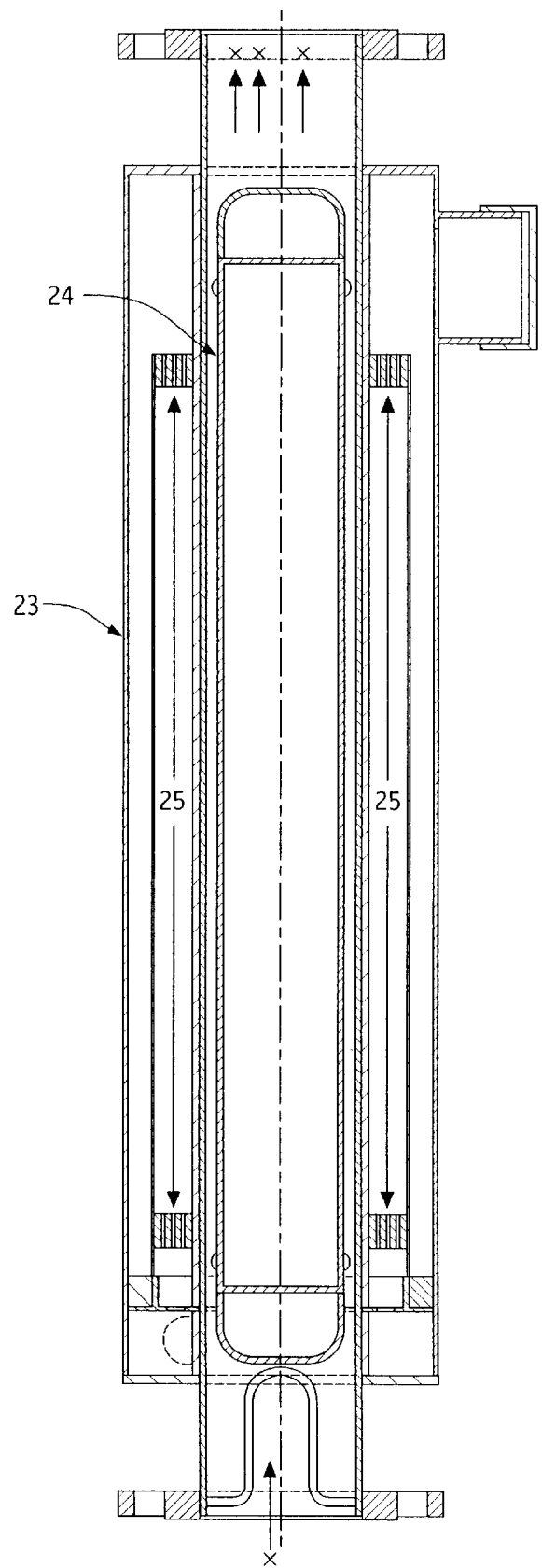
FIG. 2: Shows diagrammatically a cross-sectional view through a heating means according to one possible embodiment of the invention.

In the type of heating means 23 illustrated in FIG. 2 an inner core 24 provides for the flow of the milkfat in a direction indicated by the arrows X through the heating means 23. The inner core 24 is electrically conductive and is magnetically linked with external transformer windings 25 so that the core 24 is heated by the currents induced in it and thereby heats the milkfat passing over the inner core 24. It is emphasised that this type of electrically powered heater is but one example of a heating means which may he suitable for use with the present invention.

As mentioned previously, it is important that an intimate relationship is created between the heating means 23 and the milkfat flowing through it.

Figure 3A:
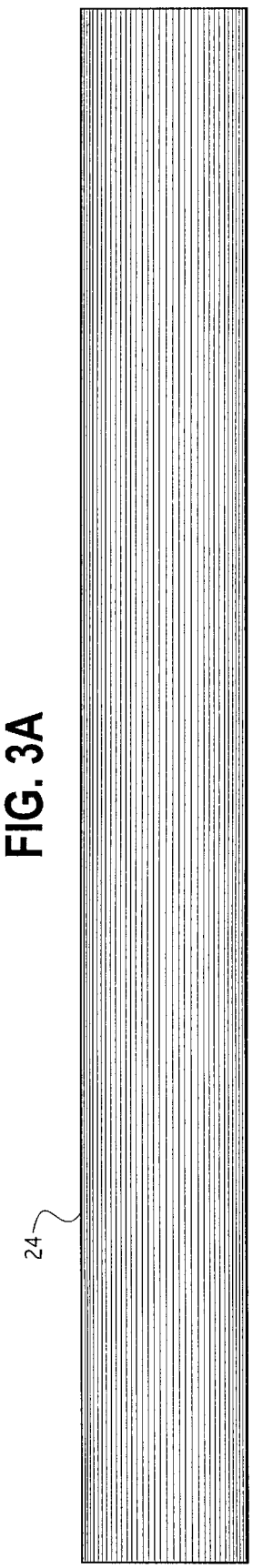
FIGS. 3(a),(b) Show diagrammatically inside and cross sectional views respectively, of an inner core for use in the heating means of FIG. 2.

Referring therefore to FIG. 3, the inner core 24 is shown as including an elongate outer surface.

Figure 3B:
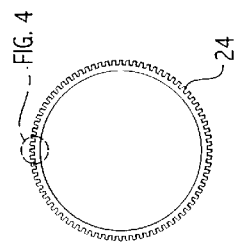
Figure 4:
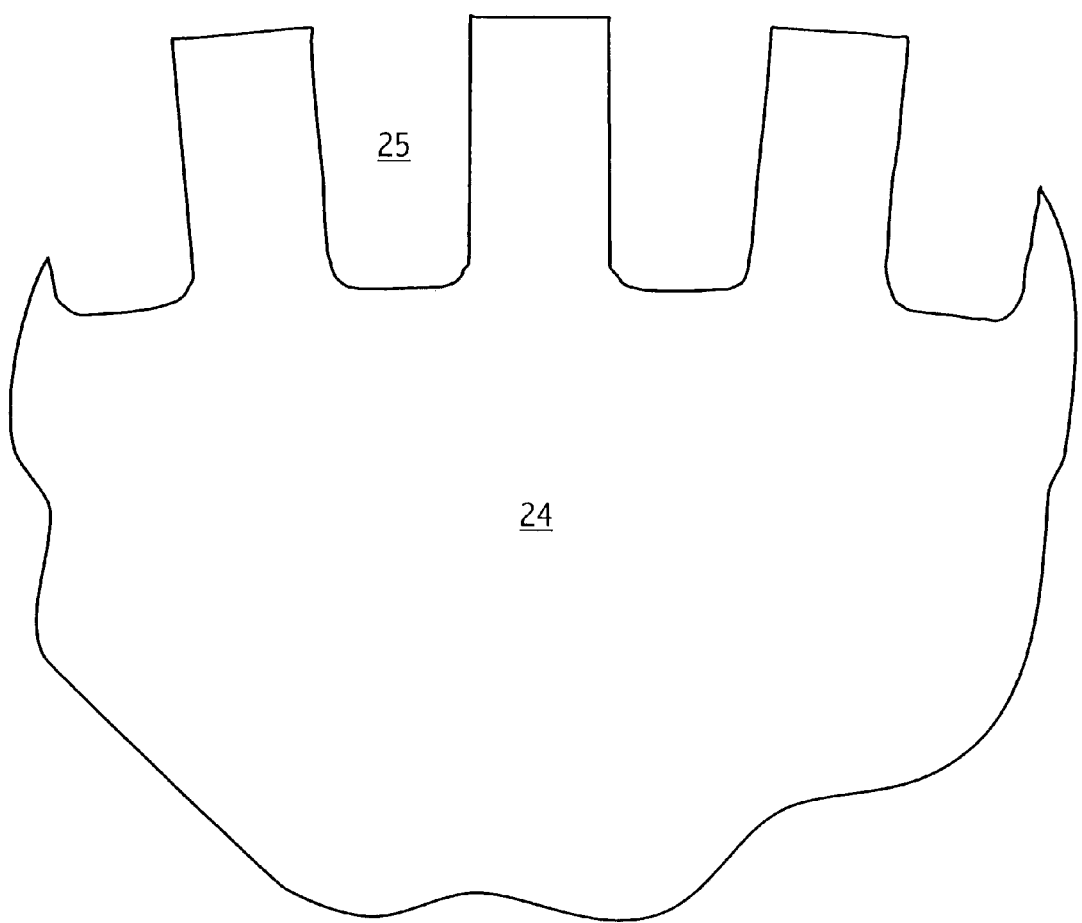
FIG. 4: Shows diagrammatically an enlarged view of the area B of FIG. 3(b)

In FIG. 4 a very enlarged view is shown of the area referenced by arrow B in FIG. 3(b). The peripheral edge or circumference defining the outer surface of the core 24 is shown including a plurality of longitudinal or spiral or other grooves or channels 25 each of which can thereby define elongate flow paths for the milkfat. In this way the milkfat is provided with an intimate thermal contact with the inner core surface to ensure efficient heating of the milkfat as it passes through the heating means 23. The number, size and shape of the grooves or channels 25 may vary depending on the rate of flow of the milkfat through the heating means 23 which is desired to be achieved and inherently the temperature which is being reached within the heating means 23.

Figure 5:
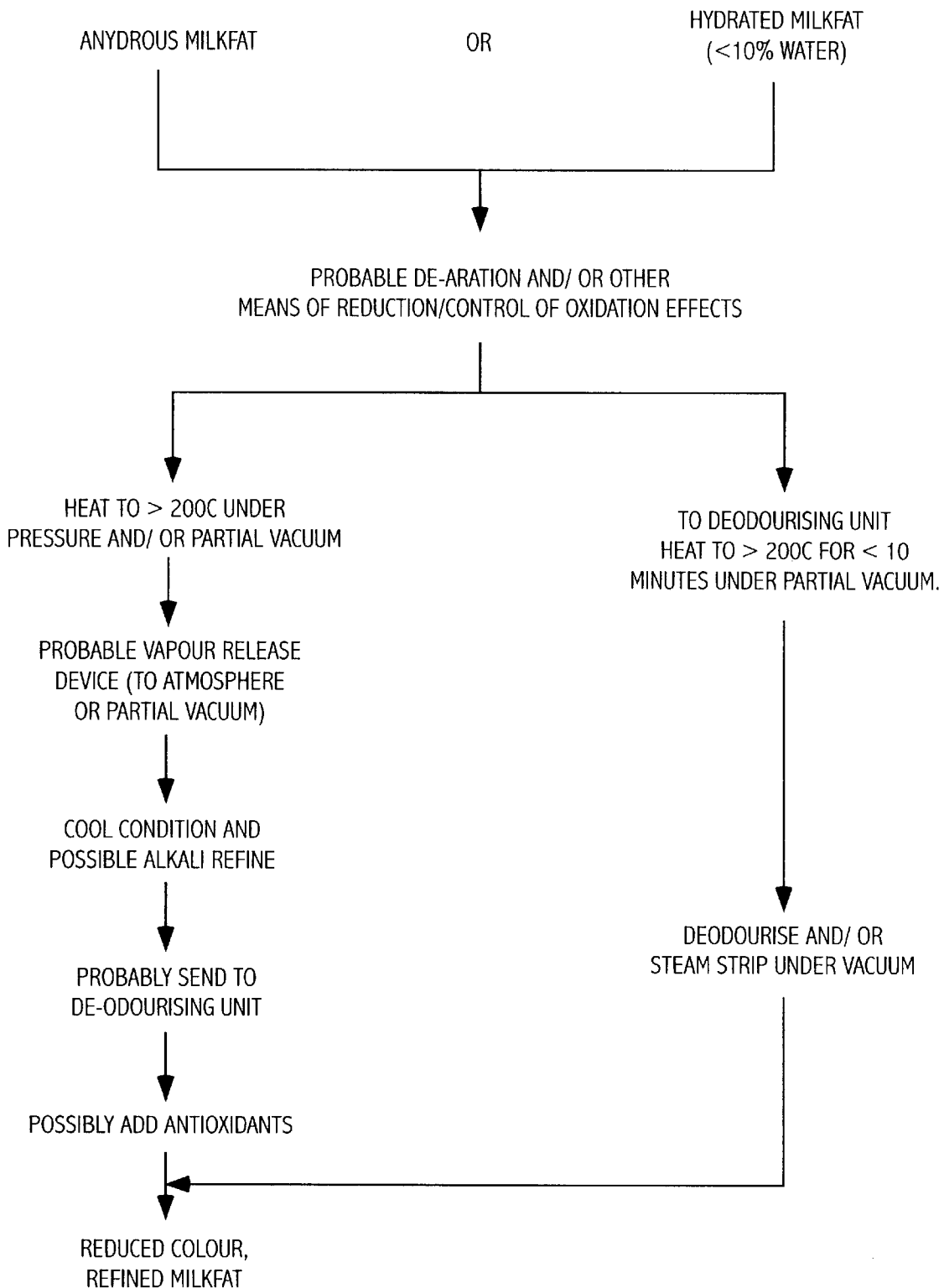
FIG. 5: Very diagrammatically provides a flow chart for possible process options according to possible embodiments of the present invention.

In FIG. 5 possible flow paths are indicated for the possible processes of the present invention. It is seen that the starting material may be provided as anhydrous milkfat or hydrated milkfat with possibly less than 10% water. The starting material is then indicated as possibly being de-aerated and/or other oxidation controls being imposed.

The milk fat is then shown in these examples as being heated to more than 200° C. for less than 10 minutes either under pressure or under partial vacuum.

It is then seen that in one potential flow path there may be a vapour release to atmosphere or partial vacuum followed by cooling and a possible alkaline refining followed by possible deodorising and the possible addition of antioxidants. In the other flow path, after heating, the milk fat is seen to possibly be deodorised and/or steam stripped under vacuum prior to the possible addition of antioxidants.

It is seen that in both these possible flow paths a high temperature, above 200° C., is applied to the milk fat for a relatively short period indicated as being less than 10 minutes. In either case in these examples the resultant milk fat has been decolourised to a sufficient extent.

The applicant has found that using a temperature in the range of between 200° C. and 300° C., a heating time of less than 10 minutes and an electrically generated and controlled heat source rather then a hot air, gas or vapour source or indirect heat source i.e. one with an intermediate thermal transfer medium, provides for an especially effective decolourisation.

Where in the foregoing description reference has been made to specific components or integers of the invention having known equivalents then such equivalents are herein incorporated as if individually set forth.

Although this invention has been described by way of example and with reference to possible embodiments thereof it is to be understood that modifications or improvements may be made thereto without departing from the scope or spirit of the invention as defined in the appended claims.

What is claimed is:

1. A process for the reduction of the color level in milkfat comprising the steps of:
   (i) providing a heating means adapted to enable a flow therethrough of a quantity of milkfat;
   (ii) controlling said flow of milkfat through said heating means and/or controlling the temperature of said heating means whereby the temperature of said milkfat as it passes through said heating means is between substantially 200° C. and 300° C. for a sufficient time to reduce the color of said milkfat by a required amount; and
   (iii) and wherein said heating means provides an intimate thermal contact with the milkfat.

2. A process as claimed in claim 1 wherein said milkfat is maintained at a temperature of between substantially 200° C. and 300° C. for a period of less than ten minutes.

3. A process as claimed in claim 1 or claim 2 wherein said milkfat is heated under pressure or partial vacuum.

4. A process as claimed in claim 3 wherein said milkfat after heating is cooled and subjected to alkaline refining.

5. A process as claimed in claim 1 or claim 2 wherein said heated milkfat is passed through a deodorising unit.

6. A process as claimed in claim 5 wherein said milkfat is steam stripped under vacuum.

7. A process as claimed in claim 1 wherein following heating antioxidants are added to said milkfat.

8. A process as claimed in claim 1 wherein said milkfat is anhydrous milkfat.

9. A process as claimed in claim 1 wherein said milkfat is hydrated milkfat with less than 10% water.

10. A process as claimed in claim 1 wherein said heating means provides an intimate thermal contact with the milkfat.

11. Apparatus for the reduction of the color level in milkfat comprising:
    (i) a heating means adapted to allow a flow therethrough of a quantity of milkfat;
    (ii) flow control and/or temperature control means provided for or associated with said heating means whereby said quantity of milkfat as it passes through said heating means is raised to a temperature of substantially between 200° C. and 300° C. for a time sufficient to decolor the quantity of milkfat by a required amount;
    (iii) and wherein said heating means provides for an intimate thermal contact between said milkfat and said heating means.

12. Apparatus as claimed in claim 11 and including a plurality of longitudinal or spiral grooves or channels through which said quantity of milkfat is caused to travel as it is heated.

13. Apparatus as claimed in claim 12 wherein said milkfat is subjected to a pressure or partial vacuum.

14. An apparatus as claimed in claim 13 and including provision for a vapour release to atmosphere or partial vacuum.

15. Apparatus as claimed in claim 11 wherein said milkfat is de-aerated before it is subjected to said heating means.

16. Apparatus as claimed in claim 11 wherein said milkfat has vapour or gas introduced into it before or after it is entered into said heating means.

17. Apparatus as claimed in claim 11 wherein said heating is carried out for less than ten minutes under pressure or partial vacuum.

18. Apparatus as claimed in claim 17 wherein said heating means includes an inner core which is electrically conductive and which is magnetically linked with external transformer windings whereby the core is heated by currents induced in it and wherein said milkfat passes over the heated inner core.

19. Apparatus as claimed in claim 18 wherein said longitudinal or spiral grooves or channels are provided on the outer surface of said heated inner core.

20. Milkfat when produced by the method or apparatus of claim 1 or claim 12.

* * * * *